(12) United States Patent
Liu

(10) Patent No.: US 9,877,513 B2
(45) Date of Patent: Jan. 30, 2018

(54) BATTERY ROD AND ELECTRONIC CIGARETTE

(71) Applicant: Kimree Hi-Tech Inc., Tortola (GB)

(72) Inventor: Qiuming Liu, Guangdong (CN)

(73) Assignee: HUIZHOU KIMREE TECHNOLOGY CO., LTD. SHENZHEN BRANCH, Guangdong (CN)

( * ) Notice: Subject to any disclaimer, the term of this patent is extended or adjusted under 35 U.S.C. 154(b) by 0 days.

(21) Appl. No.: 14/401,414

(22) PCT Filed: Mar. 3, 2014

(86) PCT No.: PCT/CN2014/072783
§ 371 (c)(1),
(2) Date: Nov. 14, 2014

(87) PCT Pub. No.: WO2015/109633
PCT Pub. Date: Jul. 30, 2015

(65) Prior Publication Data
US 2016/0316818 A1    Nov. 3, 2016

(30) Foreign Application Priority Data
Jan. 22, 2014  (CN) ..................... 2014 2 0041635 U

(51) Int. Cl.
*A24F 47/00* (2006.01)
*H02J 7/00* (2006.01)
*H01R 24/38* (2011.01)

(52) U.S. Cl.
CPC .......... *A24F 47/008* (2013.01); *H02J 7/0042* (2013.01); *H02J 7/0052* (2013.01); *H01R 24/38* (2013.01); *H05B 2203/016* (2013.01)

(58) Field of Classification Search
None
See application file for complete search history.

(56) References Cited

U.S. PATENT DOCUMENTS

2009/0095312 A1* 4/2009 Herbrich .............. A61M 11/041
                                                                131/273
2013/0169230 A1* 7/2013 Li ......................... A24F 47/008
                                                                320/114
(Continued)

FOREIGN PATENT DOCUMENTS

CN        202233002 U    5/2012
CN        202566289 U    12/2012
(Continued)

OTHER PUBLICATIONS

International Search Report dated Oct. 8, 2014 corresponding to PCT/CN2014/072783, 8 pp.
(Continued)

*Primary Examiner* — Joseph M Pelham
(74) *Attorney, Agent, or Firm* — Ohlandt, Greeley, Ruggiero & Perle, LLP

(57) ABSTRACT

A battery rod and an electronic cigarette are provided. The batter rod includes a battery cartridge, a battery accommodated in the battery cartridge, and a connection unit inserted at one end of the battery cartridge and for connecting with an atomizer. A charging assembly used to electronically connecting with a charger is inserted at one end of the battery cartridge away from the connection unit, and includes an internal electrode, an insulation holder inserted inside the battery cartridge, an insulation ring and an external electrode. The insulation ring is sleeved on an outer circumferential surface of the internal electrode. The external electrode is sleeved on an outer circumferential surface of the insulation ring. The internal electrode and the external electrode are electronically connected to two electrodes of the battery, respectively.

10 Claims, 5 Drawing Sheets

(56) References Cited

U.S. PATENT DOCUMENTS

| | | | |
|---|---|---|---|
| 2013/0220315 A1* | 8/2013 | Conley | A24F 47/008 128/202.21 |
| 2013/0336358 A1* | 12/2013 | Liu | G01K 13/002 374/152 |
| 2014/0014124 A1 | 1/2014 | Glasberg et al. | |
| 2015/0027461 A1* | 1/2015 | Liu | A24F 47/008 131/329 |
| 2015/0047660 A1* | 2/2015 | Liu | A24F 47/008 131/329 |
| 2015/0047663 A1* | 2/2015 | Liu | H01M 2/1055 131/329 |
| 2015/0107609 A1* | 4/2015 | Liu | A24F 47/008 131/329 |
| 2015/0164142 A1* | 6/2015 | Li | A24F 47/008 131/329 |
| 2016/0000148 A1* | 1/2016 | Liu | A24F 47/008 131/329 |
| 2016/0143357 A1* | 5/2016 | Liu | H02J 7/0045 206/223 |
| 2016/0198766 A1* | 7/2016 | Liu | H02J 7/0042 392/386 |
| 2016/0235119 A1* | 8/2016 | Liu | H02J 7/0042 |
| 2016/0360793 A1* | 12/2016 | Liu | H01M 2/1055 |
| 2016/0366936 A1* | 12/2016 | Liu | A24F 47/008 |
| 2017/0048930 A1* | 2/2017 | Marsh | A24F 15/18 |
| 2017/0064998 A1* | 3/2017 | Cadieux | A24F 47/008 |
| 2017/0099878 A1* | 4/2017 | Murison | A24F 47/008 |

FOREIGN PATENT DOCUMENTS

| | | | | |
|---|---|---|---|---|
| CN | 203168036 U | 9/2013 | | |
| CN | 203386835 U | 1/2014 | | |
| CN | 203398241 U | 1/2014 | | |
| EP | 2642576 A1 | 9/2013 | | |
| JP | 2011087569 A | 5/2011 | | |
| KR | 10-2012-0132004 A | 12/2012 | | |
| WO | WO 2015058367 A1 * | 4/2015 | | H02J 7/0044 |
| WO | WO 2016000207 A1 * | 1/2016 | | H01M 2/10 |

OTHER PUBLICATIONS

Written Opinion dated Oct. 8, 2014 corresponding to PCT/CN2014/072783, 4 pp.

European Search Report dated Aug. 31, 2017 for European application No. 14879933.1.

* cited by examiner 44 42 43 41

BATTERY ROD AND ELECTRONIC CIGARETTE

The present application is the national phase of International Application No. PCT/CN2014/072783, titled "BATTERY ROD AND ELECTRONIC CIGARETTE", filed on Mar. 3, 2014, which claims the priority to Chinese Patent Application No. 201420041635.1, titled "BATTERY ROD AND ELECTRONIC CIGARETTE", filed on Jan. 22, 2014 with State Intellectual Property Office of the PRC, which are incorporated herein by reference in their entireties.

BACKGROUND

1. Field of the Disclosure

The present application relates to the technical field of electronic cigarette, and particularly, to a battery rod and an electronic cigarette.

2. Discussion of the Background Art

The electronic cigarette is a common electronic product simulating the cigarette and mainly includes a liquid storage cotton, an atomizer and a battery rod. The battery rod provides power to the atomizer to heat the atomizer, and the liquid in the liquid storage cotton is vaporized to aerosolize in fumes, thereby achieving an effect of cigarette simulation.

Reference may be made to FIG. 1, where a is an external thread, b is an upper electrode, c is an internal thread, d is an upper insulation ring, e is a charging electrode, f is a battery, g is a lamp cap and h is a charging end. In a conventional electronic cigarette, the charging electrode e is provided on the battery rod where the battery rod connects with an atomizer. In usage, to charge the electronic cigarette, firstly the atomizer is detached from the battery rod, and then a connection end of a charger is connected to the charging electrode e.

However, since a user needs to detach the atomizer at each charging, which brings a great inconvenience to the user; and at a position where the atomizer connects with the battery rod, the external thread a and the internal thread c may easily be worn out due to long term use, which results in unstable connection, unreliable charging, and poor user experience.

In view of the above, it is an important and urgent technical problem to be solved by those skilled in the art to optimize the structure of the electronic cigarette to facilitate the charging of the electronic cigarette performed by the user.

SUMMARY

The present application discloses a battery rod and an electronic cigarette; by inserting a charging assembly, which is for being electronically connected with a charger, at one end of the battery rod away from an atomizer, the electronic cigarette may be charged directly without detaching the atomizer from the battery rod, which may bring a great convenience in usage; the structure is simple and compact, the assembly is convenient and the charging is reliable.

The battery rod provided in the application is applied to assemble with an atomizer to form an electronic cigarette. The battery rod includes a battery cartridge, a battery accommodated in the battery cartridge, and a connection unit which is inserted at one end of the battery cartridge and is used to connect with the atomizer. A charging assembly used to electronically connect with a charger is inserted at the one end of the battery cartridge away from the connection unit, and the charging assembly includes an internal electrode, an insulation holder, an insulation ring and an external electrode.

The insulation holder is inserted inside the battery cartridge; the internal electrode is sleeved on the insulation holder and coats one end surface of the insulation holder; the insulation ring is sleeved on an outer circumferencial surface of the internal electrode, and the external electrode is sleeved on an outer circumferencial surface of the insulation ring; a retaining, which is retainable on an end surface of the battery cartridge, is provided at one end of the external electrode; and the internal electrode and the external electrode are electronically connected to two electrodes of the battery respectively.

Optionally, a position limiting step which may obstruct the external electrode or/and the insulation ring from moving toward the connection unit is formed on a circumferencial surface of the insulation holder.

Optionally, the insulation holder is a stepped cylinder, where the stepped cylinder includes a first connection section, a second connection section and a third connection section whose radiuses gradually increase; the position limiting step includes a first position limiting step and a second position limiting step, where the first position limiting step is formed on a circumferencial surface of the second connection section at a portion protruding over the first connection section, and the second position limiting step is formed on a circumferencial surface of the third connection section at a portion protruding over the second connection section; the internal electrode is sleeved on the first connection section and coats one end surface of the first connection section, an end surface of the insulation ring is positioned opposite to an end surface of the first position limiting step, the external electrode is sleeved on the second connection section, and an end surface of the external electrode is positioned opposite to an end surface of the second position limiting step.

Optionally, the insulation holder is provided with an insertion groove, the internal electrode is provided with an insertion piece matching with the insertion groove, and the internal electrode is sleeved and fixed on the first connection section through the insertion piece.

Optionally, the battery rod further includes a controlling module which is electronically connected with the battery and is used to control the battery to provide power to the atomizer and to control the charger to charge the battery; the insulation holder is provided with an accommodation groove in connection with one end surface of the insulation holder and the insertion grove; and the controlling module is accommodated in the accommodation groove and is connected with the insertion piece through a wire in a welding manner.

Optionally, a lamp used to simulate a lighted cigarette is provided at one end of the battery rod away from the connection unit, and multiple light-transmitting holes are provided on an end surface of the internal electrode.

Optionally, the light-transmitting holes form a circle, a letter or a digit.

Optionally, a part of or all of the light-transmitting holes form a circle, a letter or a digit.

Optionally, a top end of the charging assembly, formed by the internal electrode, the insulation ring and the external electrode, includes a surface in shape of spherical cap.

An electronic cigarette provided in the application includes an atomizer and a battery rod, where the battery rod is the battery rod described above.

The battery rod and the electronic cigarette provided in the application have the following beneficial effects.

a. By providing the charging assembly, which is for being electronically connected with a charger, at one end away from the connection unit, the electronic cigarette in the application may be charged directly without detaching the atomizer from the battery rod, which may bring a great convenience to the usage and may avoid unstable connection due to frequent detachment of the battery rod from the atomizer.

b. Since the internal electrode, the insulation holder, the insulation ring and the external electrode are connected through mutual nesting and insertion, and the internal electrode is sleeved on the insulation holder and coats one end surface of the insulation holder, a connection structure is simple and compact and an assembly is convenient, which ensures a simple structure of an end portion of the charging assembly and avoids the inconvenience in usage caused by unreasonable designs. In addition, an assembled charging assembly may be inserted directly at one end of the battery cartridge during assembling, thereby improving production efficiency.

c. Since the internal electrode is sleeved on the insulation holder and coats one end surface of the insulation holder, the reliability of a connection between the internal electrode 41 and the insulation holder may be improved, and the internal electrode is avoided from coming into the battery cartridge in a case that the internal electrode is striken by external force; in addition, with this kind of structure, a contact area between the internal electrode 41 and a charger may be increased, thereby improving the reliability of charging.

d. Since the retaining section, which may be retained on the end surface of the battery cartridge, is provided at one end of the external electrode, the charging assembly may be avoided from coming into the battery cartridge in a case that the charging assembly is striken by external force.

BRIEF DESCRIPTION OF THE DRAWINGS

For more clearly illustrating a technical solution of embodiments of the present application or conventional technology, drawings referred to describe the embodiments or the conventional technology are briefly described hereinafter.

Apparently, the drawings in the following description are only for several embodiments of the present application, and for those skilled in the art, other drawings may be obtained based on these drawings without any creative efforts.

DETAILED DESCRIPTION OF THE EMBODIMENTS

Figure 1:
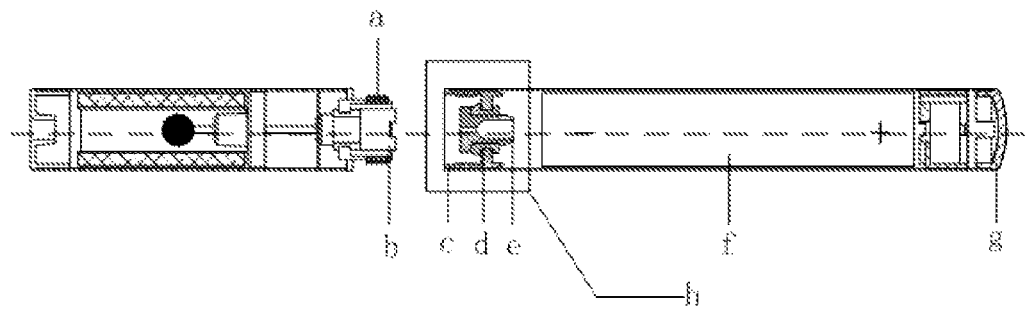
FIG. 1 is a sectional view of a conventional electronic cigarette.
Figure 2:
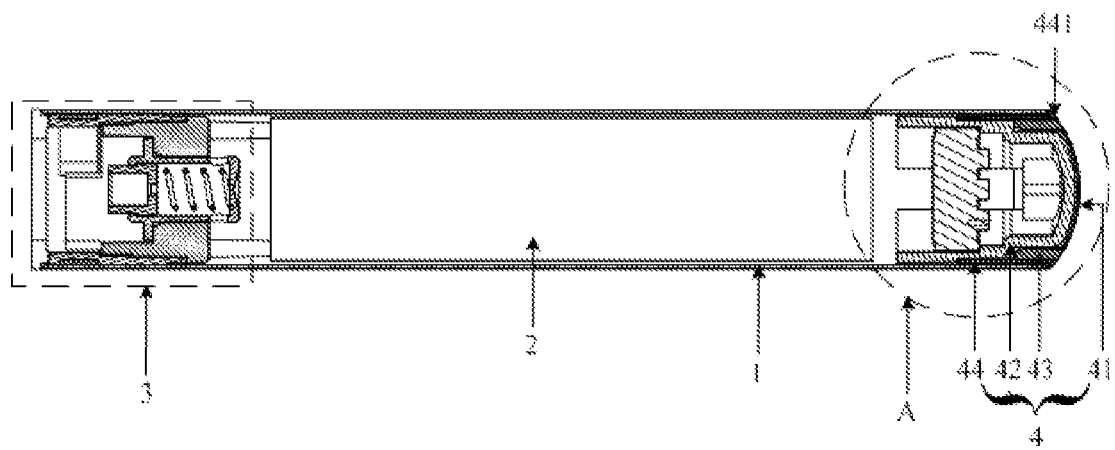
FIG. 2 is a sectional structural view of a battery rod according to a first embodiment of the application.
Figure 3:
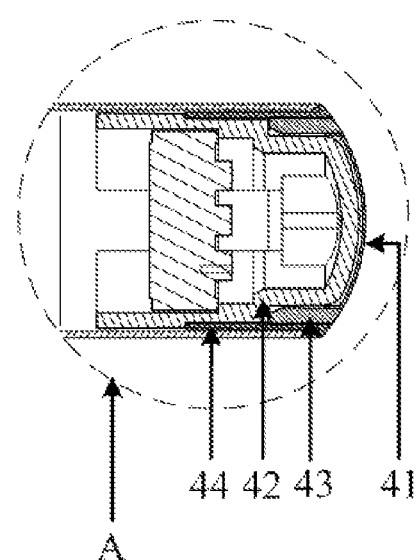
FIG. 3 is an enlarged view of zone A in FIG. 2.
Figure 4:
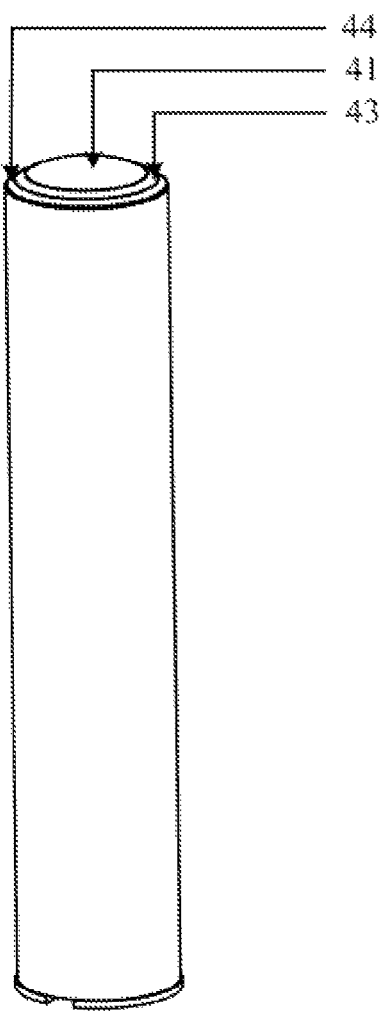
FIG. 4 is a three-dimensional structural view of the battery rod according to the first embodiment of the application.
Figure 5:
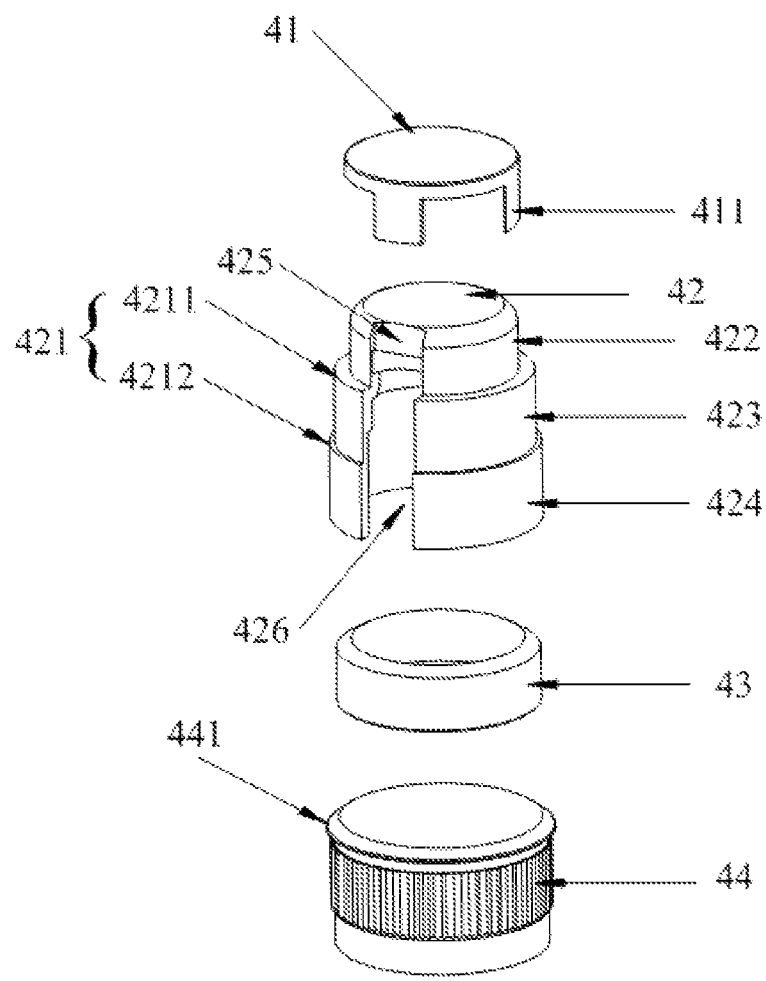
FIG. 5 is an exploded structural view of a charging assembly of the battery rod according to the first embodiment of the application.

The present application discloses a battery rod and an electronic cigarette; by inserting a charging assembly, which is for being electronically connected with a charger, at one end of the battery rod away from an atomizer, the electronic cigarette may be charged directly without detaching the atomizer from the battery rod, which may bring a great convenience in usage.

Technical solutions according to embodiments of the application are described clearly in detail hereinafter in conjunction with drawings in the embodiments of the present application. Apparently, the described embodiments are not all but only a part of the embodiments of the present application. All the other embodiments made by those with ordinary skills in the art based on the embodiments of the application without any creative efforts shall be within the protection scope of the present application. Reference may be made to FIG. 2-FIG. 5. A battery rod according to a first embodiment of the application includes a battery cartridge 1, a battery 2 accommodated in the battery cartridge 1, and a connection unit 3 which is inserted at one end of the battery cartridge 1 and is used to connect with an atomizer. A charging assembly 4 used to electronically connect with a charger is inserted at one end of the battery cartridge 1 away from the connection unit 3. The charging assembly includes an internal electrode 41, an insulation holder 42, an insulation ring 43 and an external electrode 44.

The insulation holder 42 is inserted inside the battery cartridge 1, and the internal electrode 41 is sleeved on the insulation holder 42 and coats one end surface of the insulation holder 42; the insulation ring 43 is sleeved on an outer circumferencial surface of the internal electrode 41, and the external electrode 44 is sleeved on an outer circumferencial surface of the insulation ring 43; a retaining section 441, which may be retained on an end surface of the battery cartridge 1, is provided at one end of the external electrode 44; and the internal electrode 41 and the external electrode 44 are electronically connected to two electrodes of the battery 2 respectively.

The battery rod provided in the present application includes the battery cartridge 1, the battery 2, the connection unit 3 and the charging assembly 4, where the charging assembly 4 includes the internal electrode 41, the insulation holder 42, the insulation ring 43 and the external electrode 44. In a case that an electronic cigarette needs to be charged, charging may be implemented solely by connecting a charging device with the internal electrode 41 and the external electrode 44 in the battery rod, and it is not required to detach the battery rod from the atomizer in advance, which may bring a great convenience to usage and may avoid unstable connection due to frequent detachment of the battery rod from the atomizer.

Since the internal electrode 41, the insulation holder 42, the insulation ring 43 and the external electrode 44 are connected through mutual nesting and insertion, and the internal electrode 41 is sleeved on the insulation holder 42 and coats one end surface of the insulation holder 42, a connection structure is simple and compact and an assembly is convenient, which ensures a simple structure of an end portion of the charging assembly and avoids the inconvenience in usage caused by unreasonable designs. In addition, an assembled charging assembly may be inserted directly at one end of the battery cartridge during assembling, thereby improving production efficiency.

Since the internal electrode 41 is sleeved on the insulation holder 42 and coats one end surface of the insulation holder 42, the reliability of a connection between the internal electrode 41 and the insulation holder 42 may be improved, and the internal electrode 41 is avoided from coming into the battery cartridge in a case that the internal electrode 41 is striken by external force; in addition, with this kind of structure, a contact area between the internal electrode 41 and a charger may be increased, thereby improving the reliability of charging.

Since the retaining section 441, which may be retained on the end surface of the battery cartridge 1, is provided at one end of the external electrode 44, the charging assembly 4 may be avoided from coming into the battery cartridge in a case that the charging assembly is striken by external force.

The above mentioned internal electrode 41 may be a conductive sheet metal formed by punching; the insulation holder 42 and the insulation ring 43 may be made of plastic or bakelite; and the external electrode 44 may be a metal sleeve processed by a metal turning technique, and an external surface of the metal sleeve is taken as a conductive electrode.

Optionally, a position limiting step 421 which may obstruct the external electrode 44 or/and the insulation ring 43 from moving toward the connection unit 3 is formed on a circumferencial surface of the insulation holder 42.

Optionally, the insulation holder 42 is a stepped cylinder, where the stepped cylinder includes a first connection section 422, a second connection section 423 and a third connection section 424 whose radiuses gradually increase. The position limiting step 421 includes a first position limiting step 4211 and a second position limiting step 4212, where the first position limiting step 4211 is formed on a circumferencial surface of the second connection section 423 at a portion protruding over the first connection section 422, and the second position limiting step 4212 is formed on a circumferencial surface of the third connection section 424 at a portion protruding over the second connection section 423. The internal electrode 41 is sleeved on the first connection section 422 and coats one end surface of the first connection section 422; an end surface of the insulation ring 43 is positioned opposite to an end surface of the first position limiting step 4211; the external electrode 44 is sleeved on the second connection section 423; and an end surface of the external electrode 44 is positioned opposite to an end surface of the second position limiting step 4212.

Since the insulation holder 42 is provided with the first position limiting step 4211 and the second position limiting step 4212, the external electrode 44 and the insulation ring 43 may be effectively prevented from moving toward the connection unit 3 in a case that an end portion of the charging assembly 4 is striken by an external force toward the connection unit 3, thereby improving the solidness and reliability of the battery rod.

Optionally, the insulation holder 42 is provided with an insertion groove 425, the internal electrode 41 is provided with an insertion piece 411 matching with the insertion groove 425, and the internal electrode 41 is sleeved and fixed on the first connection section 422 through the insertion piece 411. With the configuration of the insertion groove 425, the internal electrode 41 may be effectively fixed. It shall be understood that the insulation holder 42 may be provided with no insertion groove 425, and in this case, the internal electrode 41 may be provided as a barrel having an opening at one end.

Optionally, the battery rod further includes a controlling module 5 which is electronically connected with the battery 2 and is used to control the battery 2 to provide power to the atomizer and to control the charger to charge the battery. The insulation holder 42 is provided with an accommodation groove 426 in connection with one end surface of the insulation holder 42 and the insertion groove 425. The controlling module 5 is accommodated in the accommodation groove 426 and is connected with the insertion piece 411 through a wire in a welding manner. This configuration makes it convenient to assemble the controlling module 5. It shall be noted that, the accommodation groove 426 may further accommodate fine parts of the battery rod besides the controlling module 5, which may save the space of the electronic cigarette and make the structure of the electronic cigarette more compact.

Optionally, a lamp for simulating a lighted cigarette is provided at one end of the battery rod away from the connection unit 3, and an end surface of the internal electrode 41 is provided with several light-transmitting holes.

Optionally, the light-transmitting holes form a circle, a letter or a digit.

Optionally, a part of or all of the light-transmitting holes form a circle, a letter or a digit.

Optionally, a top end of the charging assembly 4, formed by the internal electrode 41, the insulation ring 43 and the external electrode 44, has a surface in shape of spherical cap. With the spherical cap structure, the structure of the end portion of the battery rod is simplified, and the internal electrode 41 and the external electrode 44 are easy to be electronically connected with the charger, thereby improving the reliability in charging.

Figure 6:
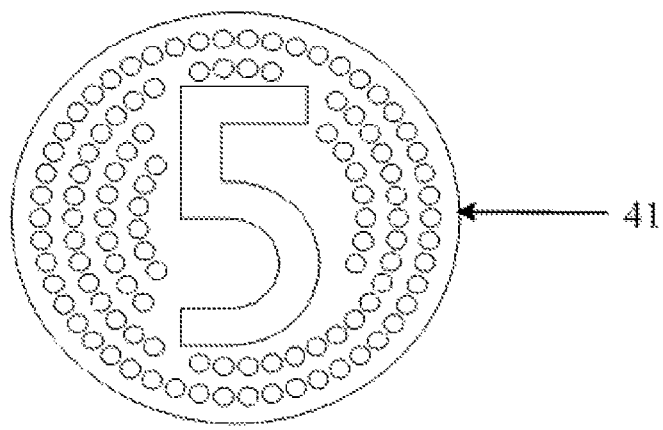
FIG. 6 is a structural view of a battery rod according to a second embodiment of the application.

Reference may be made to FIG. 6, which shows a battery rod according to a second embodiment of the application. Different from the first embodiment, in the present embodiment, a lamp is further provided on the battery rod and several light-transmitting holes are provided on the internal electrode 41. The light-transmitting holes may form a circle, a letter or a digit, or any combination thereof. The lamp may produce a brilliant visional effect through the light-transmitting holes. With patterns formed by the light-transmitting holes on the internal electrode 41, individual demands and experiences of users may be well satisfied, and value in using the electronic cigarette provided in the application is further improved.

The battery rod provided in the application is described hereinabove. By inserting a charging assembly, which is used to electronically connect with the charger, at one end of the battery rod away from the connection unit, the electronic cigarette may be charged directly without detaching the atomizer from the battery rod, thereby bringing a great convenience to usage.

Figure 7:
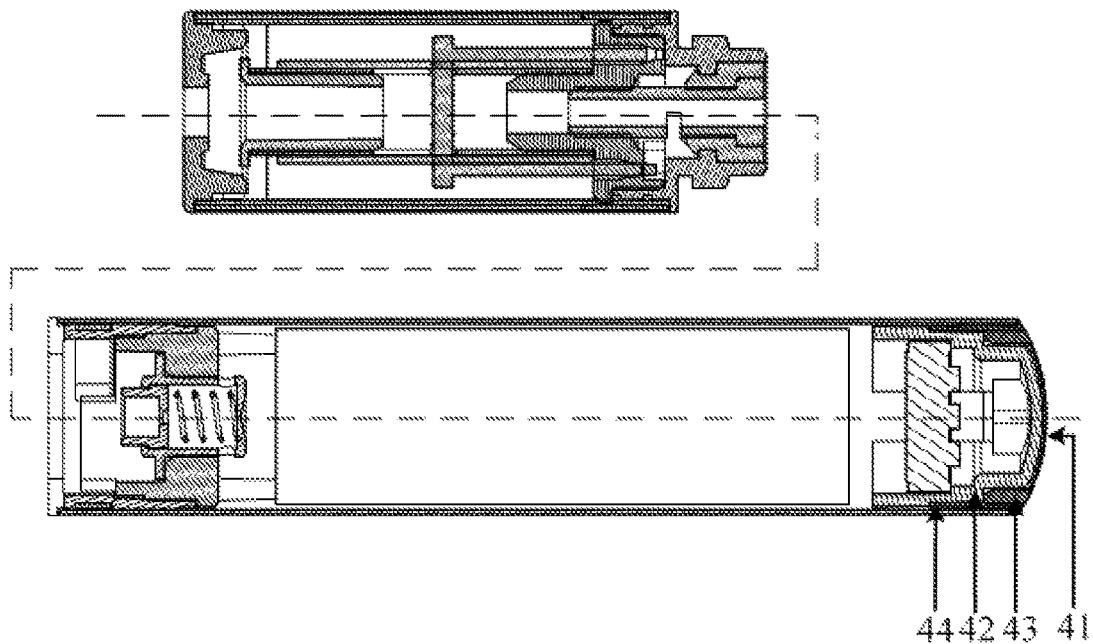
FIG. 7 is a structural view of an electronic cigarette according to an embodiment of the application.

An electronic cigarette according to an embodiment of the application is described hereunder. As shown in FIG. 7, the electronic cigarette provided in the application includes an atomizer and a battery rod, and the battery rod may be the battery rod according to the first embodiment or the second embodiment. In the embodiment, the atomizer and the battery rod are connected in a detachable manner. It shall be understood that the atomizer and the battery rod may be provided as an undetachable integration, which is not limited herein.

Since the battery rod of the electronic cigarette in the application is of the same structure with the battery rod according to the first or the second embodiment of the application, the electronic cigarette in the application shall also possess the same technical effects. The atomizer is a conventional atomizer, which is not detailed herein.

Detailed descriptions of the battery rod and the electronic cigarette provided in the application are given hereinabove. Specific examples are applied to describe the principle and embodiments of the application. The illustration of the above embodiments merely helps in understanding the method and core mind of the application. It shall be noted that, for those with ordinary skills in the art, various improvements and modifications may be made to the application without departing from the principle of the application, and these improvements and modifications shall be within the protection scope defined by the claims of the application.

The invention claimed is:

1. A battery rod, applied to assemble with an atomizer to form an electronic cigarette, the battery rod comprising: a battery cartridge, a battery accommodated in the battery cartridge, and a connection unit which is inserted at one end of the battery cartridge and is configured to connect with the atomizer, wherein a charging assembly configured to electronically connect with a charger is inserted at one end of the battery cartridge away from the connection unit, and the charging assembly comprises an internal electrode, an insulation holder, an insulation ring and an external electrode;

wherein the insulation holder is inserted inside the battery cartridge, the internal electrode is sleeve-coupled to the insulation holder and coats one end surface of the insulation holder; the insulation ring is sleeve-coupled to an outer circumferencial surface of the internal electrode, and the external electrode is sleeve-coupled to an outer circumferencial surface of the insulation ring; the external electrode includes a retaining boss, which is retainable on an end surface of the battery cartridge, at one end of the external electrode; and the internal electrode and the external electrode are electronically connected to two electrodes of the battery respectively.

2. The battery rod according to claim 1, wherein a position limiting step configured to obstruct the external electrode and the insulation ring from moving toward the connection unit is formed on a circumferencial surface of the insulation holder.

3. The battery rod according to claim 2, wherein the insulation holder is a stepped cylinder, the stepped cylinder comprises a first connection section, a second connection section and a third connection section whose radiuses gradually increase; the position limiting step comprises a first position limiting step and a second position limiting step; the first position limiting step is formed on a circumferencial surface of the second connection section at a portion protruding over the first connection section, and the second position limiting step is formed on a circumferencial surface of the third connection section at a portion protruding over the second connection section; the internal electrode is sleeve-coupled to the first connection section and coats one end surface of the first connection section, an end surface of the insulation ring is positioned opposite to an end surface of the first position limiting step, the external electrode is sleeve-coupled to the second connection section, and an end surface of the external electrode is positioned opposite to an end surface of the second position limiting step.

4. The battery rod according to claim 3, wherein an insertion groove is provided on the insulation holder, an insertion piece matching with the insertion groove is provided on the internal electrode, and the internal electrode is sleeve-coupled to and fixed on the first connection section through the insertion piece.

5. The battery rod according to claim 4, wherein the battery rod further comprises a controlling module which is electronically connected with the battery and is configured to control the battery to provide power to the atomizer and to control the charger to charge the battery; the insulation holder is provided with an accommodation groove in connection with one end surface of the insulation holder and in connection with the insertion grove, and the controlling module is accommodated in the accommodation groove and is connected with the insertion piece through a wire in a welding manner.

6. The battery rod according to claim 1, wherein a lamp configured to simulate a lighted cigarette is provided at one end of the battery rod away from the connection unit, and multiple light-transmitting holes are provided on an end surface of the internal electrode.

7. The battery rod according to claim 6, wherein the light-transmitting holes form a circle, a letter or a digit.

8. The battery rod according to claim 6, wherein a part of or all of the light-transmitting holes form a circle, a letter or a digit.

9. The battery rod according to claim 1, wherein a top end of the charging assembly, formed by the internal electrode, the insulation ring and the external electrode, comprises a surface in shape of spherical cap.

10. An electronic cigarette, comprising an atomizer and a battery rod, wherein, the battery rod comprises: a battery cartridge, a battery accommodated in the battery cartridge, and a connection unit which is inserted at one end of the battery cartridge and is configured to connect with the atomizer, wherein a charging assembly configured to electronically connect with a charger is inserted at one end of the battery cartridge away from the connection unit, and the charging assembly comprises an internal electrode, an insulation holder, an insulation ring and an external electrode;

wherein the insulation holder is inserted inside the battery cartridge, the internal electrode is sleeve-coupled to the insulations holder and coats one end surface of the insulation holder; the insulation ring is sleeve-coupled to an outer circumferencial surface of the internal electrode, and the external electrode is sleeve-coupled to an outer circumferencial surface of the insulation ring; the external electrode includes a retaining boss, which is retainable on an end surface of the battery cartridge, at one end of the external electrode; and the internal electrode and the external electrode are electronically connected to two electrodes of the battery respectively.

* * * * *